US009269089B2

(12) United States Patent
Kalaboukis et al.

(10) Patent No.: US 9,269,089 B2
(45) Date of Patent: Feb. 23, 2016

(54) METHOD AND SYSTEM FOR MEDIA PROMOTION

(75) Inventors: Chris Kalaboukis, Los Gatos, CA (US); Roberto Fisher, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1395 days.

(21) Appl. No.: 11/944,445

(22) Filed: Nov. 22, 2007

(65) Prior Publication Data

US 2009/0138346 A1    May 28, 2009

(51) Int. Cl.
*G06Q 30/00*    (2012.01)
*G06Q 30/02*    (2012.01)

(52) U.S. Cl.
CPC ............ *G06Q 30/02* (2013.01); *G06Q 30/0217* (2013.01)

(58) Field of Classification Search
CPC ............................ G06Q 30/02; G06Q 30/0217
See application file for complete search history.

(56) References Cited

U.S. PATENT DOCUMENTS

| | | | |
|---|---|---|---|
| 7,366,682 B1 * | 4/2008 | Katiyar et al. ............. | 705/14.51 |
| 7,630,986 B1 * | 12/2009 | Herz et al. ............................. | 1/1 |
| 8,504,420 B2 * | 8/2013 | Rosenberger .......... | G06Q 30/02 |
| | | | 705/14.4 |
| 2002/0052825 A1 * | 5/2002 | Bensemana ...................... | 705/37 |
| 2002/0108109 A1 * | 8/2002 | Harris et al. .................... | 725/32 |
| 2003/0018525 A1 * | 1/2003 | Joao ................................ | 705/14 |
| 2006/0031114 A1 * | 2/2006 | Zommers ........................ | 705/10 |
| 2006/0053449 A1 * | 3/2006 | Gutta .............................. | 725/46 |
| 2006/0282319 A1 * | 12/2006 | Maggio .......................... | 705/14 |
| 2007/0206247 A1 * | 9/2007 | Kaplan .......................... | 358/527 |
| 2007/0220552 A1 * | 9/2007 | Juster et al. ..................... | 725/46 |
| 2008/0004916 A1 * | 1/2008 | Panay ............................... | 705/5 |
| 2008/0114649 A1 * | 5/2008 | Swirsky et al. ................. | 705/14 |
| 2008/0155607 A1 * | 6/2008 | Klappert ........................ | 725/58 |
| 2008/0243923 A1 * | 10/2008 | Mazor et al. ............... | 707/104.1 |
| 2009/0077033 A1 * | 3/2009 | McGary et al. .................... | 707/3 |
| 2009/0222117 A1 * | 9/2009 | Kaplan et al. .................. | 700/94 |
| 2009/0254971 A1 * | 10/2009 | Herz et al. ........................ | 726/1 |
| 2011/0145602 A1 * | 6/2011 | Ginter et al. ................. | 713/193 |
| 2013/0104159 A1 * | 4/2013 | John .............................. | 725/14 |

* cited by examiner

*Primary Examiner* — Tarek Chbouki (74) *Attorney, Agent, or Firm* — Berkeley Law & Technology Group, LLP (57) ABSTRACT

Systems and methods have been developed for promoting media objects to users. More specifically, systems and methods have been developed for profiling a user media repository and delivering promotional media objects to the user's media repository based upon the profile.

30 Claims, 4 Drawing Sheets

METHOD AND SYSTEM FOR MEDIA PROMOTION

BACKGROUND

Increasingly the Internet and other networks (e.g., wired and wireless networks) are utilized to transmit content in the form of media objects (e.g., video, audio, etc.) between users and content providers or distributors. Users may consume (e.g., watch, listen to, etc.) or otherwise utilize this content in various locations and with various media applications (e.g., client devices). Advertisers, promoters and other third parties who wish to market or otherwise offer media objects to users often must evaluate market trends in order to determine what kind of content will appeal to consumers.

SUMMARY

Systems and methods have been developed for promoting media objects to users. More specifically, systems and methods have been developed for profiling a user media repository and delivering promotional media objects to the user's media repository based upon the profile.

In one embodiment (which embodiment is intended to be illustrative and not restrictive), a method for media promotion is provided. The method includes profiling a user media repository to generate user profile data that describes the use of media objects by a user of the user media repository. The method further includes aggregating, into aggregate profile data, the user profile data and other profile data corresponding to a plurality of other users of other media repositories. The method yet further includes delivering the aggregate profile data to a promoter. The method still further includes receiving, from the promoter, promotion data that corresponds to the aggregate profile data. The method further includes delivering, to the user media repository, the promotion data corresponding to the user profile data.

In one aspect of the method, the promotion data includes at least one media object. In another aspect of the method, the promotion data includes at least one address referencing a media object. In yet another aspect, the method further includes anonymizing the user profile data prior to performing the step of aggregating, into aggregate profile data, the user profile data and other profile data corresponding to a plurality of other users of other media repositories. In still another aspect, the method includes anonymizing the aggregate profile data. In another aspect, the method includes, prior to performing the step of delivering, to the user media repository, the promotion data corresponding to the user profile data, receiving permission from the user of the user media repository to deliver the promotion data corresponding to the user profile data. In yet another aspect, the method includes receiving compensation from the promoter for performing the step of delivering the aggregate profile data to a promoter or the step of delivering, to the user media repository, the promotion data corresponding to the user profile data. In still another aspect of the method, the compensation is non-monetary. In another aspect, the method includes storing, by the user, the media objects in the user media repository prior to performing the step of profiling a user media repository to generate user profile data that describes the use of media objects by a user of the user media repository. In yet another aspect, the method includes receiving a request from the user to suppress subsequent delivery, to the user media repository, of the promotion data corresponding to the user profile data. In still another aspect, the method includes suppressing the subsequent delivery, to the user media repository, of the promotion data corresponding to the user profile data. In another aspect, the method includes receiving compensation from the user for performing the step of delivering, to the user media repository, the promotion data corresponding to the user profile data. In yet another aspect of the method, the compensation is non-monetary.

In one embodiment (which embodiment is intended to be illustrative and not restrictive), a method for media promotion is provided. The method includes profiling a user media repository to generate user profile data that describes the use of media objects by a user of the user media repository. The method further includes aggregating, into aggregate profile data, the user profile data and other profile data corresponding to a plurality of other users of other media repositories. The method yet further includes inviting a promoter to deliver promotion data that corresponds to the aggregate profile data. The method still further includes delivering at least a portion of the aggregate profile data to the promoter. The method further includes receiving, from the promoter, the promotion data that corresponds to the aggregate profile data. The method yet further includes delivering, to the user media repository, the promotion data corresponding to the user profile data.

In one aspect, the method includes receiving compensation from the user for performing the step of delivering, to the user media repository, the promotion data corresponding to the user profile data. In another aspect of the method, the compensation is non-monetary. In yet another aspect of the method, the step of inviting a promoter to deliver promotion data that corresponds to the aggregate profile data and the step of delivering at least a portion of the aggregate profile data to the promoter are performed together. In still another aspect, the method includes suggesting to the promoter the promotion data that corresponds to the aggregate profile data. In another aspect, the method includes receiving compensation from the user for performing the step of delivering, to the user media repository, the promotion data corresponding to the user profile data. In yet another aspect of the method, the compensation is non-monetary. In still another aspect of the method, the promotion data includes at least one media object. In another aspect of the method, the promotion data includes at least one address referencing a media object.

In one embodiment (which embodiment is intended to be illustrative and not restrictive), a system for media promotion is provided. The system includes a server connected via a network to a media application of a client. The system further includes a user media repository connected to the server that stores media objects accessible by the media application of the client. The system yet further includes a user profile engine connected to the server that analyzes and aggregates usage data of media objects stored within the user media repository. The system still further includes a communications module connected to the server that communicates the aggregate usage data via the network to a promoter.

In one aspect of the system, the promoter is connected via the network to the server and promotion data. In another aspect of the system, the promotion data is accessible to the communications module via the network.

These and various other features as well as advantages will be apparent from a reading of the following detailed description and a review of the associated drawings. Additional features are set forth in the description which follows, and in part will be apparent from the description, or may be learned by practice of the described embodiments. While it is to be understood that both the foregoing general description and the following detailed description are exemplary and explanatory, the benefits and features will be realized and attained by the structure particularly pointed out in the written description and claims hereof as well as the appended drawings.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

The following detailed description is intended to convey a thorough understanding of the embodiments described by providing a number of specific embodiments and details involving systems and methods for transforming media objects. It should be appreciated, however, that the claims appended hereto are not limited to these specific embodiments and details, which are exemplary only. It is further understood that one possessing ordinary skill in the art, in light of known systems and methods, would appreciate the applicability of this disclosure for its intended purposes and benefits in any number of alternative embodiments, depending upon specific design and other needs.

As further set forth in this disclosure, including the claims and figures appended hereto, the term format is used interchangeably to refer to the format of the media object container or data structure (e.g., a file format such as a jpeg, .mp3, or .avi file) or the format of the content that is embodied within the media object (e.g., video content in a high-definition format that is down converted to a lower resolution format, or a color picture formatted as a black-and-white picture, or video content that is transformed from a video format into an audio format). Thus, changing the format of a media object may include, but is not limited to, modifying or otherwise manipulating a media object file or the content contained within a media object file.

Additionally, as further set forth in this disclosure, including the claims and figures appended hereto, consumption of media objects may take place on a variety of computing devices and/or media applications (i.e., software). For example, computing devices may include, but are not limited to, personal computers, mobile computers (i.e., laptops or mobile phones), televisions, set-top-boxes, and personal digital assistants. Typically, computing devices will include a processor and memory for storing data and software. Computing devices may include operating systems that allow execution of software programs and manipulation of data. As set forth herein, computing devices may communicate using many types of networks, including but not limited to wired and wireless data connections (e.g., computing devices may interconnect via wired connections to the Internet). One skilled in the art will recognize that computing devices and networks may take many forms that are within the scope of this disclosure.

As yet further set forth in this disclosure, including the claims and figures appended hereto, an engine is meant to describe a software, hardware or firmware (or combinations thereof) system, process or functionality that performs or facilitates the processes, features and/or functions described herein (with or without human interaction or augmentation).

Figure 1:
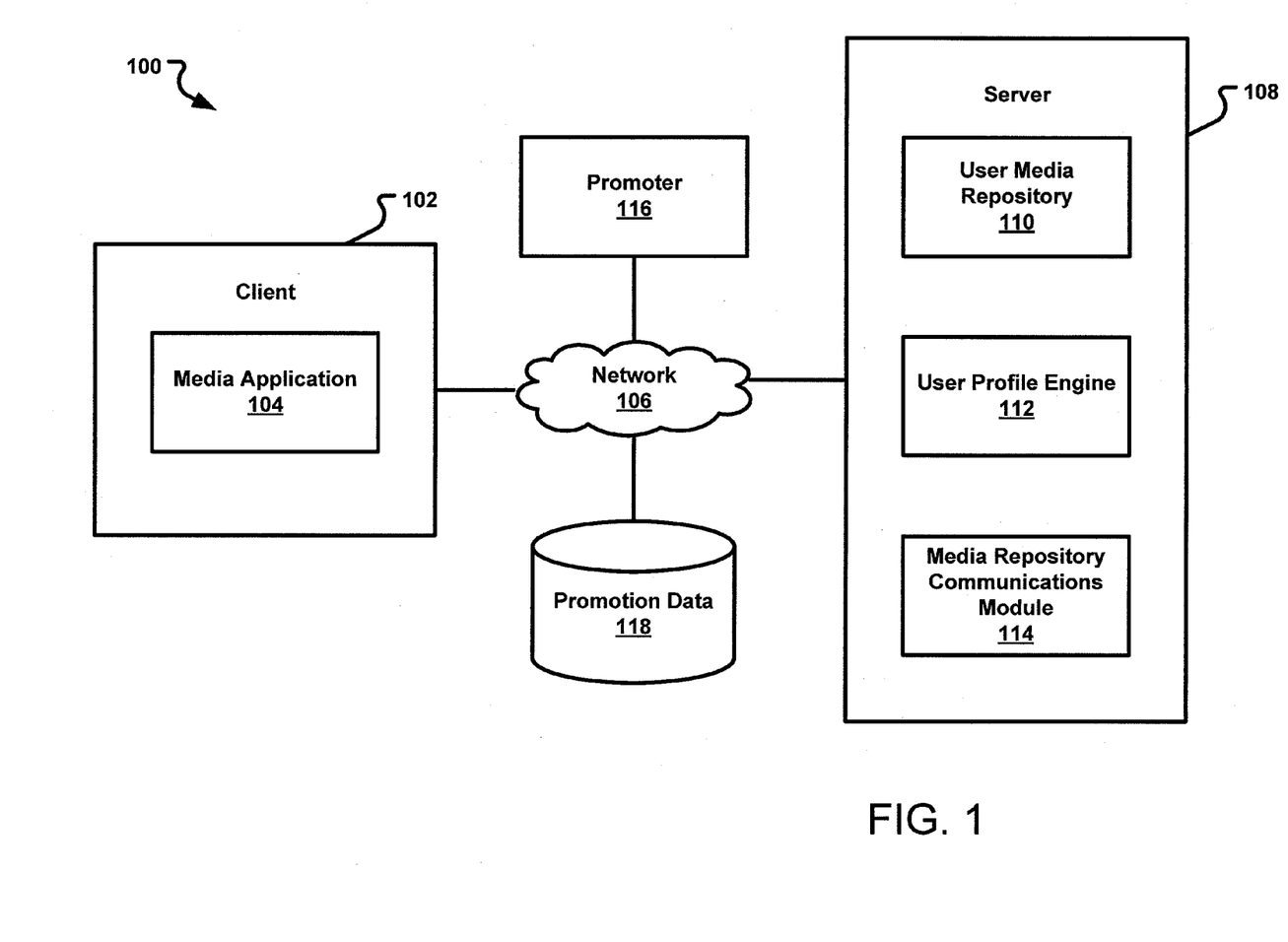
FIG. 1 illustrates an embodiment of a system for transforming media objects.

FIG. 1 illustrates an embodiment of a system 100 for media object promotion. The system 100 is a computing architecture that comprises a client 102 computing device and server 108 computing device that are connected via a network 106. The client 102 may be comprised of a variety of computing devices, including, but not limited to, personal computers, personal digital assistants, telephones, wireless devices, gaming systems, and other devices. For example, the client 102 may be comprised of a personal computer that includes a processor and memory, upon which software may be executed. In an embodiment, a media application 104 comprising instructions may be executed on a processor of the client 102. A media application 104 may itself be comprised of instructions and other data in the form of software for execution on the client device 102. For example, a media application 104 may be comprised of one or more programs, such as a web browser, a media playback application, and other software for consuming media objects. One skilled in the art will recognize that many types of media applications 104 may exist that are within the scope of this disclosure. The client 102 computing device may be connected to the server 108 via a network 106, such as the internet. A network may be comprised of one or more computing device (e.g., servers and other computing devices) that are interconnected wirelessly or in wired configurations. One skilled in the art will recognize that many types of networks that exist that are within the scope of this disclosure. Typically, a network 106 is comprised of computers and associated devices that are connected by communications facilities. A network 106 may involve permanent connections, such as cables or temporary connections made through telephone or other communications links. A network 106 may be as small as a local area network (LAN) and may be comprised of a few computers, printers, and/or other devices, or it may also be comprised of small and large computers distributed over a vast geographic area (e.g., a wide-area network (WAN)). A server 108 may be comprised of one or more computers that are interconnected to one or more client 102 devices via a network 106. A server 108 may be comprised of one or more computers and/or programs that respond to commands from a client 102. Typically, for example, a file server may contain an archive of data or program files. When a client 102 submits a request for a file, the server 108 may transfer a copy of the file to the client 102. A server 108 may include or be connected to one or more hard disks and/or other storage devices. One skilled in the art will recognize that a server 108 may also be comprised of computing devices that may not include certain storage devices. Typically, a server 108 may serve (e.g., stream and/or otherwise deliver) files to a client 102 via a network 106. Files and other media objects may reside within a user media repository 110. A user media repository 110 may itself be comprised of one or more computing devices for recording computer data in permanent, semi-permanent, or temporary form. For example, a user media repository 110 may be comprised of random access memory, read-only memory, and other types of memory. Alternatively, or in addition, a server 108 may also be comprised of various types of physical storage media. For example, a user media repository 110 may be comprised of devices such as hard disks, tape and optical disks, and/or other types of physical storage media on which data bits are written and stored.

In one embodiment, a user profile engine 112 is provided for profiling the consumption and/or storage of media objects within a user media repository 110. The user profile engine 112 may be comprised of hardware and/or software. For example, the user profile engine 112 may be comprised of a hardware counter that counts consumption (e.g., playback events) or storage of certain genres of media objects in the user media repository 110. The user profile engine 112 may also be comprised of software. For example, the user profile engine 112 may be comprised of one or more processes that monitor the consumption and storage of media objects within the user media repository 110. Further to this example, the user profile engine 112 may aggregate media object usage data (e.g., data describing the consumption and/or storage of media objects) that may eventually be delivered to a promoter 116.

In one embodiment, a server 108 may further comprise a media repository communications module 114. The media repository communications module 114 may itself be comprised of hardware and/or software for delivering and/or receiving data (e.g., media objects) and instructions from a client 102 and/or promoter 116. For example, as discussed below, a media repository communications module 114 may include, but is not limited to including, one or more servers that may be distributed or that may operate in parallel. The media repository communications module 114 may also communicate with other computing devices (e.g., as described below, the media repository communications module 114 may communicate with other third parties and/or servers).

In one embodiment of system 100, a media application 104 of a client 102 communicates via network 106 to the server 108. The media application 104 may request one or more media objects stored within a user media repository 110 for consumption at the media application 104. Alternatively, or in addition, the media application 104 may request that one or more media objects be stored within the user media repository 110 at server 108. In one embodiment, the user profile engine 112 profiles the user media repository 110 to generate user profile information that may describe the use (e.g., consumption and/or storage) of media objects within the user media repository 110. In this embodiment, the profile data may then be aggregated by user profile engine 112 and communicated to a promoter 116 via media repository communications module 114. The profile data may suggest or describe to the promoter opportunities for marketing promotional data 118 (e.g., media objects, advertising, data, etc.) within the user media repository 110. For example, the promotional data 118 may include one or more media objects of popular genres of media objects that are stored within the user media repository 110. As another example, the promotion data may include web pages, or other information, that may be related to the consumption characteristics of media objects within the user media repository 110. Further to this example, consumption of media objects may involve temporal (i.e., time), spatial (i.e., geographic) or other characteristics that describe how media objects may be used (e.g., consumed, played, rendered, stored, modified, saved, etc.). The promotion data 118 may then be delivered by the promoter 116 such that media repository communications module 114 receives the promotion data 118 and incorporates some or all of the data within the user media repository 110. For example, a promoter 116 may communicate media objects in the form of video files that may be co-mingled or integrated within the user media repository 110 such that a user may consume the video files. In one embodiment, the user may pay a fee to the promoter 116 for consuming promotion data 118 within the user media repository 110. In another embodiment, the promoter 116 may pay a fee to communicate and/or include the promotion data 118 within the user media repository 110.

Figure 2:
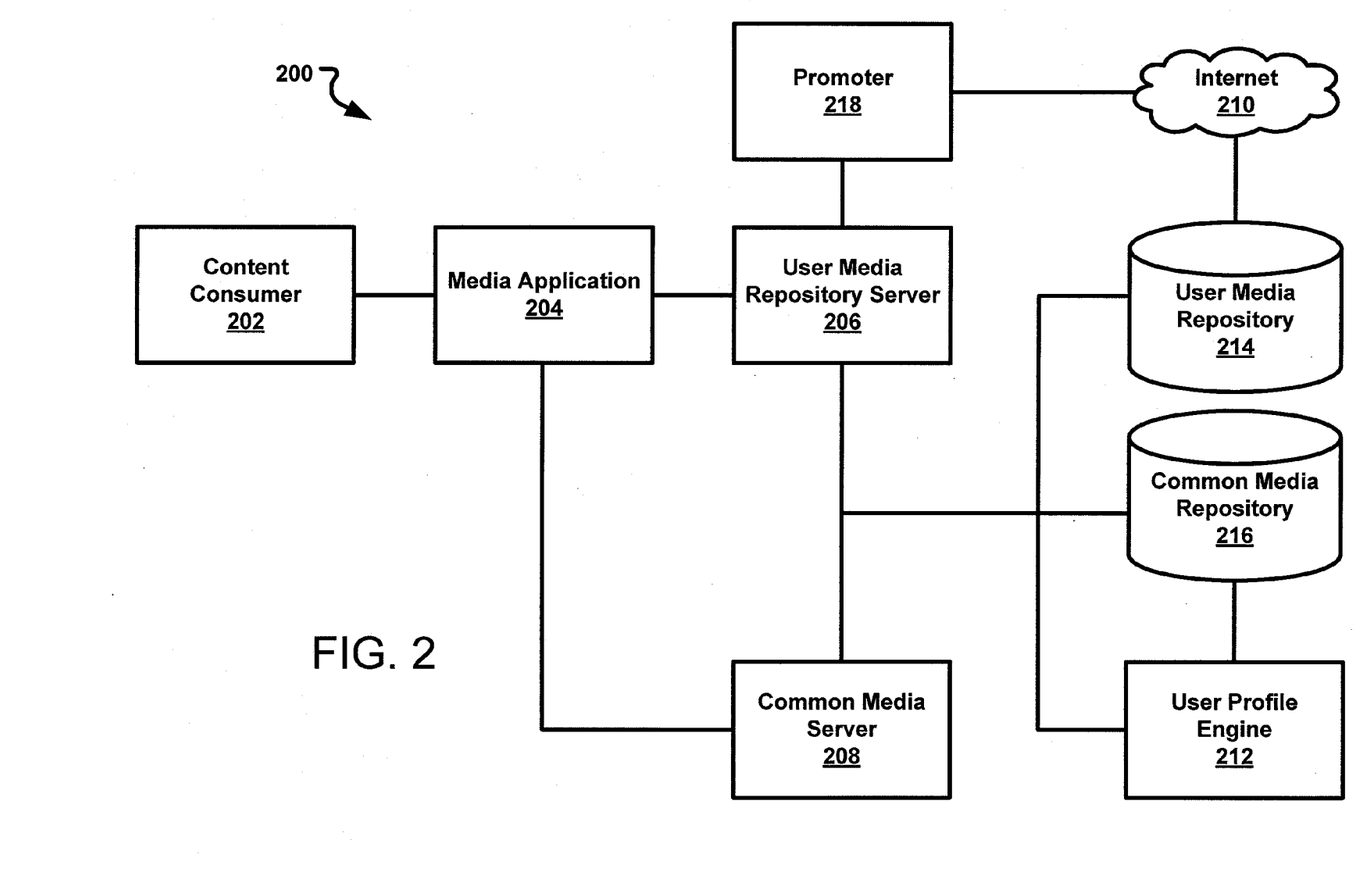
FIG. 2 illustrates another embodiment of another system for media object promotion.

FIG. 2 illustrates another embodiment of a system 200 for media object promotion. The system 200 is another computing architecture for promoting media objects. In the system 200, a content consumer 202 (i.e., a user) requests, using a media application 204, a media object from the user's media repository datastore 214. The request is received from the media application 204 by a user media repository server 206 and may identify a media object or a reference to a media object within the media repository datastore 214 or a media object or reference to a media object located at a common media repository 216 or a network such as the Internet 210. The request itself, or the events taking place in response to the request (e.g., consumption of the media object) may be used to generate profile data by a user profile engine 212 (i.e., a dedicated user profile server). As described above, the user profile engine 212 may aggregate profile data (e.g., data or information describing the consumption of media objects). A common media server 208 then communicates the aggregate profile data to a promoter 218. The promoter 218 may then provide promotion data (e.g., additional media objects retrieved from the Internet 210) to the user media repository server 206 for inclusion within the media repository datastore 214. In one embodiment, the promoter 218 may utilize aggregate promotion data to deliver media objects in the form of web pages to the media repository datastore 214. Later, upon consumption of media objects corresponding to the promotion data, the content consumer 202 may simultaneously be presented with the web pages that may be rendered (e.g., displayed as advertisements) within media application 204.

Figure 3:
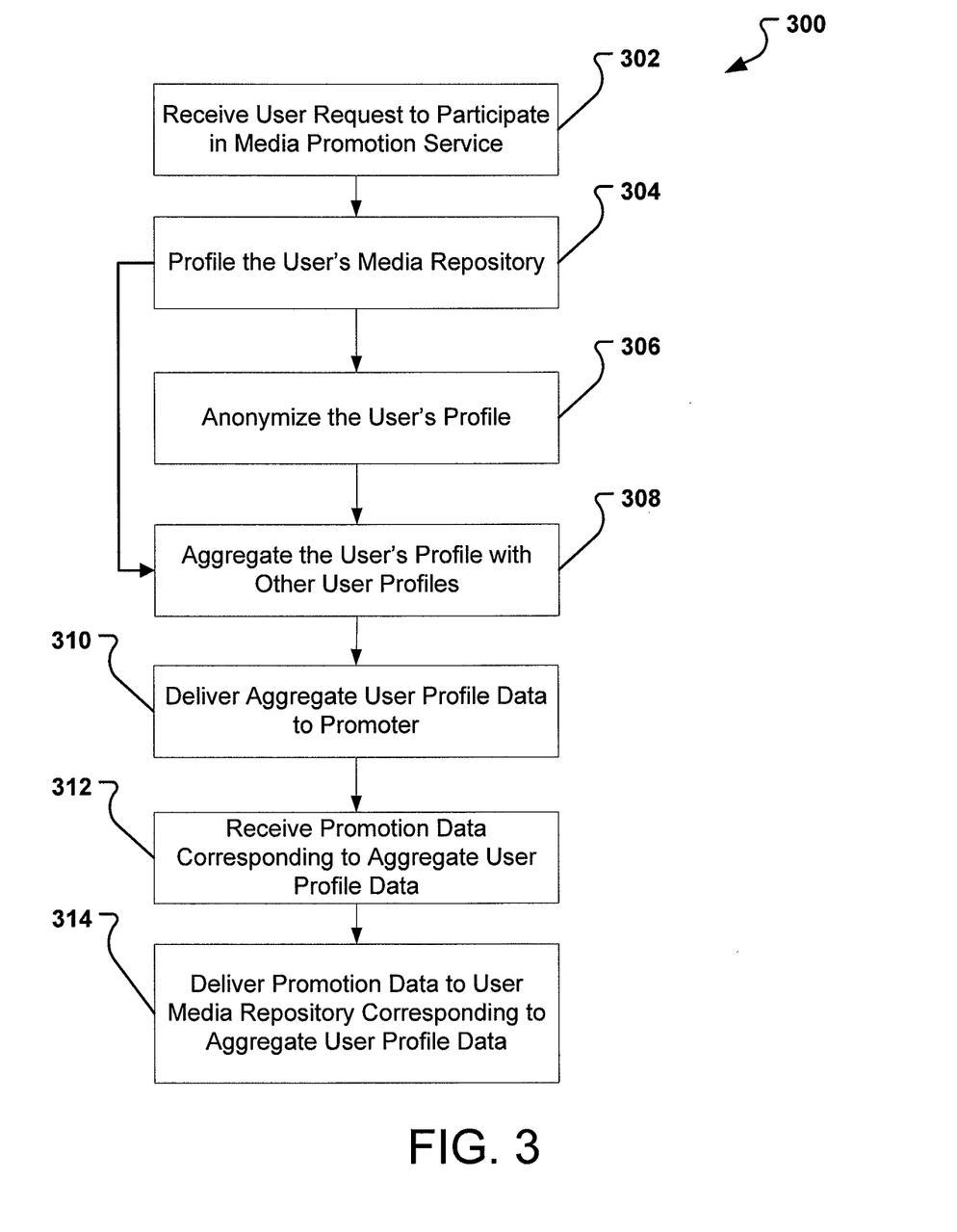
FIG. 3 illustrates an embodiment of a method for promoting media objects.

FIG. 3 illustrates an embodiment of a method 300 for promoting media objects. In the embodiment of the method 300, a user media repository is profiled 304 to generate user profile data that describes the use of media objects by a user of the user media repository. Profiling 304 a user's media repository may occur in response to receiving 302 a request (i.e., a request to opt-in) to participate in a media promotion service (i.e., a user may request to permit inclusion of all or certain media objects that are part of a promotion service). For example, a user may request access to promotion data in the form of media objects that may be downloaded into or otherwise made accessible to their user media repository. Alternatively, a user may request that promotion data be precluded or suppressed from being made available within their user media repository. In the embodiment of the method 300, the user profile information may then be aggregated 308 with profile data from other users. For example, aggregation of user profile data may include, but is not limited to, tabulating popularly consumed media objects from a plurality of media repositories residing on one or more servers. Aggregation 308 of user profile data, may or may not also include anonymizing 306 personal identifying information associated with a user. Anonymizing 306 may occur prior to aggregation 308 of user profile data. In the embodiment of the method 300, the aggregate user profile data is then delivered 310 to a promoter. One skilled in the art will recognize that promoters may take many forms, including but not limited to content providers, content distributors, advertisers, and others. Promoters typically may use the aggregated user profile data to identify and transmit promotion data (e.g., media objects, addresses referencing media objects, and other data) that corresponds to the aggregate user profile data. In the embodiment of the method 300, the promotion data is then received 312 and delivered 314 to the user media repository(ies) that correpond(s) to the aggregate user profile data. For example, promotion data may be received that targets certain users (a subset of a total collection of users that may be more receptive to the promotion data). Following this example, the promotion data may then be delivered 314 to the certain users. To illustrate this example, a promoter may transmit promotion data comprising a new music-video file of Madonna. The Madonna video file may then be delivered 314 to those user's whose repositories include, for example, "pop-rock" genre music or other music by Madonna. On the other hand, users whose user media repository includes only media objects related to a different genre (e.g., classical music) may not appreciate any such delivery.

In another embodiment, the method 300 may further comprise, prior to delivering the promotion data to a user media repository, receiving permission from the user of the user media repository to deliver the promotion data corresponding to the user profile data. In yet another embodiment of the method 300, compensation (e.g., monetary and/or non-monetary compensation) may be received from a promoter for delivering 310 aggregate user profile data to the promoter and/or delivering promotion data to the user media repository. Similarly, compensation may also be received from a user of the user media repository for the delivery 314 of promotion data to the user media repository or consumption of promotion data within the user media repository. In yet another embodiment of the method 300, media objects may be stored in a user's media repository prior to profiling 304 the user media repository. Alternatively, references or addresses to remotely stored media objects may reside in a user media repository and thus not require storage of media objects within the user media repository prior to profiling 304 the user media repository.

Figure 4:
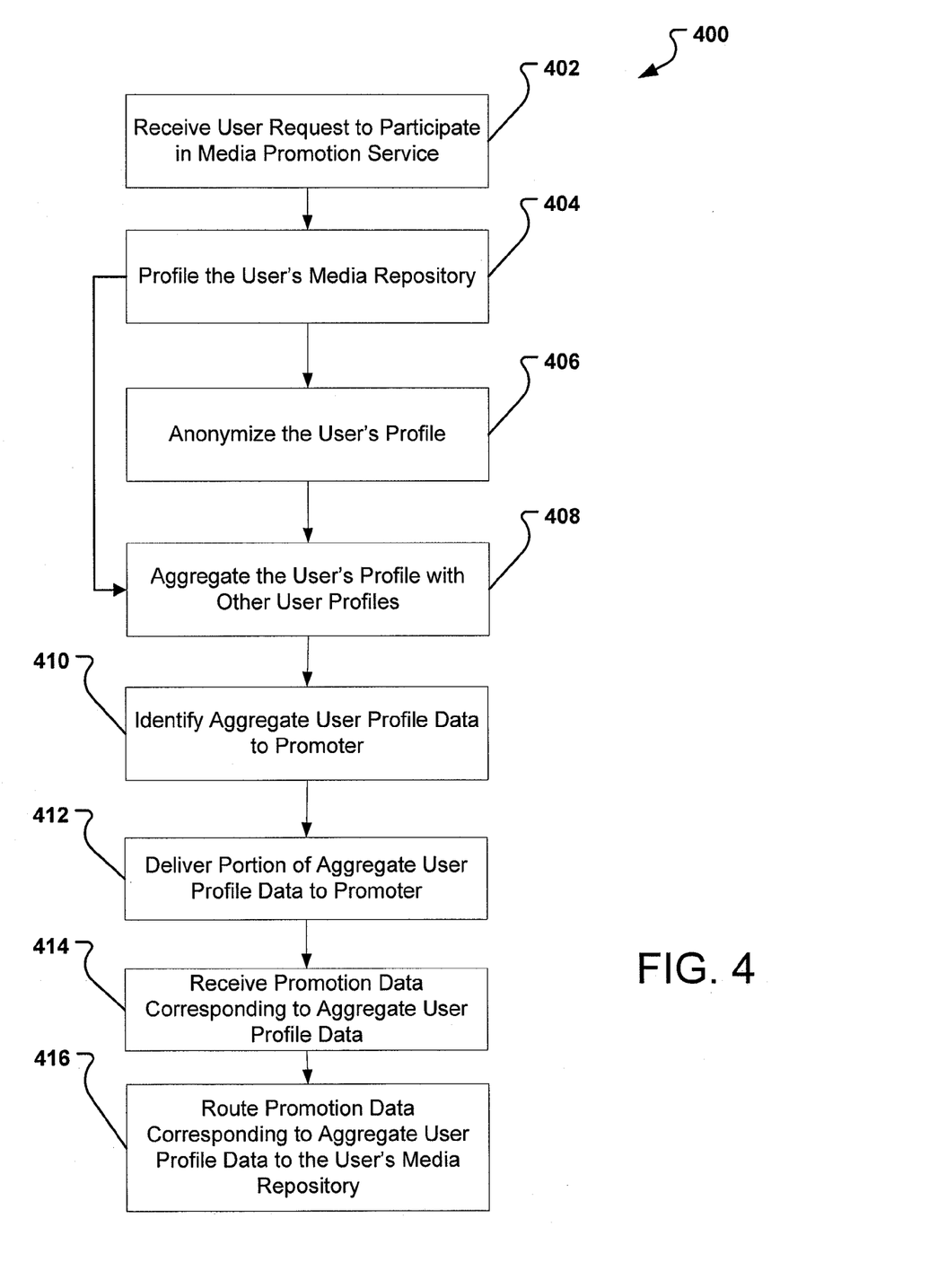
FIG. 4 illustrates another embodiment of a method for promoting media objects.

FIG. 4 illustrates another embodiment of a method 400 for promoting media objects. In the embodiment of the method 400, a user media repository is profiled 404 to generate user profile data that describes the use of media objects by a user of the user media repository. Profiling 404 a user's user media repository may occur in response to receiving 402 a request (i.e., a request to opt-in) to participate in a media promotion service (i.e., a user may request to permit inclusion of all or certain media objects that are part of a promotion service). For example, a user may request access to promotion data in the form of media objects that may be downloaded into or otherwise made accessible to their user media repository. Alternatively, a user may request that promotion data be precluded or suppressed from being made available within their user media repository. In the embodiment of the method 400, the user profile information may then be aggregated 408 with profile data from other users. For example, aggregation of user profile data may include, but is not limited to, tabulating popularly consumed media objects from a plurality of media repositories residing on one or more servers. Aggregation 408 of user profile data, may or may not also include anonymizing 406 personal identifying information associated with a user. Anonymizing 406 may occur prior to aggregation 408 of user profile data. Aggregate user profile data may then be identified 410 to a promoter by inviting the promoter to deliver 412 promotion data that corresponds to the aggregate profile data. Promotion data may then be received 414 and routed 416 to the user media repository(ies) that correspond(s) with at least a portion of the aggregate user profile data identified 410 to the promoter. In one embodiment, identifying 410 may include delivering 412 at least a portion of the aggregate profile data to the promoter and receiving 414, from the promoter, the promotion data that corresponds to the aggregate profile data. For example, the identification 410 of aggregate profile data may include aggregate user profile information that includes data showing the consumption preferences of certain users (e.g., targeted users for certain promotion data). As described above, compensation may be received from a user or promoter for routing 416 promotion data to user media repositories and/or identifying 410 aggregate user profile data to promoters.

In other embodiments, one or more of the above referenced methods may comprise a computer readable medium encoding or containing computer executable instructions for performing a method for displaying a web page element. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of this disclosure. For example, identification of trends in matching aggregate use profile data with the promotion data supplied by promoters may be offered back to promoters, possibly in return for compensation. As another example, a promoter may identify media objects within other user media repositories that may then be delivered to a certain user's media repository such that the promoter need not transmit promotion data for delivery to the user's media repository.

Numerous other changes may be made which will readily suggest themselves to those skilled in the art and which are encompassed in the spirit of this disclosure and as defined in the appended claims.

What is claimed is:

1. A method comprising:
   profiling, via a server computing device, an individual user media repository individually associated with an individual user based at least in part on a use by the individual user of one or more media objects of the individual user media repository, the profiling to generate individual user profile content associated with the individual user media repository that describes the use of the one or more media objects by the individual user;

aggregating, into aggregate profile content via the server computing device, the individual user profile content associated with the individual user media repository and respective profile content corresponding to a plurality of other respective users of other respective media repositories;

delivering, over a network, the aggregate profile content from the server computing device to a promoter;

receiving, from the promoter at the server computing device, promotional content that corresponds to the aggregate profile content;

providing compensation from the server computing device to the promoter to authorize consumption by the individual user of the promotional content; and delivering, from the server computing device to the individual user media repository over the network, the promotional content corresponding to the aggregate profile content.

2. The method of claim 1 wherein the promotional content comprises at least one media object.

3. The method of claim 1 wherein the promotional content comprises at least one address referencing a media object.

4. The method of claim 1 further comprising: anonymizing the individual user profile content prior to the aggregating the user profile content.

5. The method of claim 1 further comprising: anonymizing the aggregate profile content.

6. The method of claim 1 further comprising: prior to the delivering the promotional content, receiving permission from the individual user of the individual user media repository to deliver the promotional content corresponding to the aggregate profile content.

7. The method of claim 1 further comprising: receiving compensation at the server computing device from the promoter at least in part in response to the delivering the aggregate profile content to the promoter from the server computing device and/or the delivering the promotional content from the server computing device to the individual user media repository.

8. The method of claim 7 wherein the compensation comprises nonmonetary compensation.

9. The method of claim 1 further comprising: storing, by the individual user, the media objects in the individual user media repository prior to profiling the user media repository.

10. The method of claim 1 further comprising: receiving a request from the individual user to suppress subsequent delivery, to the individual user media repository, of the promotional content corresponding to the aggregate profile content.

11. The method of claim 10 further comprising: suppressing the subsequent delivery, to the individual user media repository, of the promotional content corresponding to the aggregate profile content.

12. The method of claim 1 further comprising: receiving compensation at the server computing device from the individual user at least in part in response to the delivering the promotional content from the server computing device to the individual user media repository.

13. The method of claim 12 wherein the compensation comprises nonmonetary compensation.

14. The method of claim 1, further comprising: receiving at the server computing device compensation from the individual user to authorize the consumption by the individual user of the promotional content.

15. The method of claim 14, wherein the promotional content comprises one or more web pages renderable within a media application executed by a user computing device.

16. A method comprising:

profiling, via a server computing device, an individual user media repository individually associated with an individual user based at least in part on a use by the individual user of one or more media objects of the individual user media repository, the profiling to generate individual user profile content associated with the individual user media repository that describes the use of the one or more media objects by the individual user;

aggregating, into aggregate profile content via the server computing device, the individual user profile content and respective profile content corresponding to a plurality of other respective users of other media respective repositories;

inviting, via the server computing device, a promoter to deliver to the server computing device promotional content that corresponds to the aggregate profile content, including providing compensation from the server computing device to the promoter to authorize consumption by the individual user of the promotional content;

delivering, over a network, at least a portion of the aggregate profile content from the server computing device to the promoter;

receiving, from the promoter at the server computing device, the promotional content that corresponds to the aggregate profile content; and delivering, from the server computing device to the individual user media repository over the network, the promotional content corresponding to the aggregate profile content.

17. The method of claim 16 further comprising: receiving at the server computing device compensation from the individual user at least in part in response to the delivering the promotional content from the server computing device to the individual user media repository.

18. The method of claim 17 wherein the compensation from the individual user comprises nonmonetary compensation.

19. The method of claim 16 wherein the inviting and the delivering at least a portion of the aggregate profile content to the promoter are performed concurrently.

20. The method of claim 16 further comprising: suggesting to the promoter the promotional content that corresponds to the aggregate profile content.

21. The method of claim 16 further comprising: receiving at the server computing device compensation from the individual user at least in part in response to the delivering the promotional content from the server computing device to the individual user media repository.

22. The method of claim 21 wherein the compensation from the individual user comprises nonmonetary compensation.

23. The method of claim 16 wherein the promotional content comprises at least one media object.

24. The method of claim 16 wherein the promotional content comprises at least one address referencing a media object.

25. The method of claim 16, wherein the promotional content comprises one or more web pages renderable within a media application executed by a user computing device.

26. A system comprising:

a server comprising a processor capable of being connected via a network to a media application of an individual user computing device;

an individual user media repository capable of being connected to the server to store one or more media objects to be accessible by the media application of the individual user computing device, the individual user media repository to be individually associated with an individual user;

the processor to analyze usage content of the one or more media objects to be stored within the individual user media repository and to aggregate into aggregate profile content the usage content of the one or more media objects to be stored within the individual user media repository and respective profile content that corresponds to a plurality of other respective users of other respective media repositories;

wherein the server to communicate the aggregate profile content via the network to a promoter associated with a computing device, the server further to provide compensation to the promoter to authorize consumption by the individual user of promotional content to correspond to the aggregate profile content.

27. The system of claim 26 wherein the promoter is to be connected via the network to the server, the promoter to provide promotional content that corresponds to the aggregate profile content.

28. The system of claim 26 wherein the promotional content is to be accessible to the server via the network.

29. The system of claim 26, the processor further to: receive at the server compensation from the individual user to authorize the consumption by the individual user of the promotional content.

30. The system of claim 29, wherein the promotional content to comprise one or more web pages to be renderable within a media application executed by a user computing device.

* * * * *